May 18, 1965 P. SCHMIDT 3,183,799
CONTAINER MAKING ARRANGEMENT
Filed Sept. 19, 1962 10 Sheets-Sheet 1
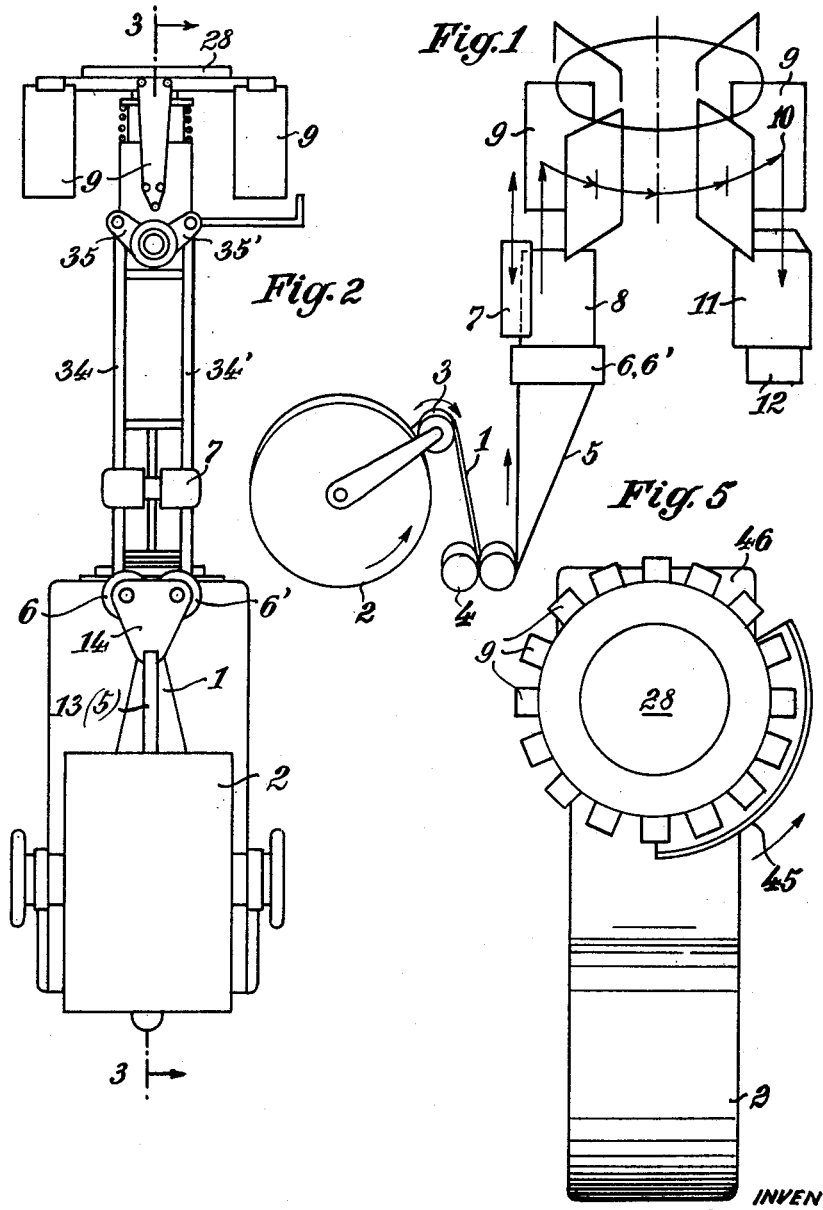
INVENTOR
Paul Schmidt
by:
Michael S. Striker
Attorney May 18, 1965 P. SCHMIDT 3,183,799
CONTAINER MAKING ARRANGEMENT
Filed Sept. 19, 1962 10 Sheets-Sheet 2
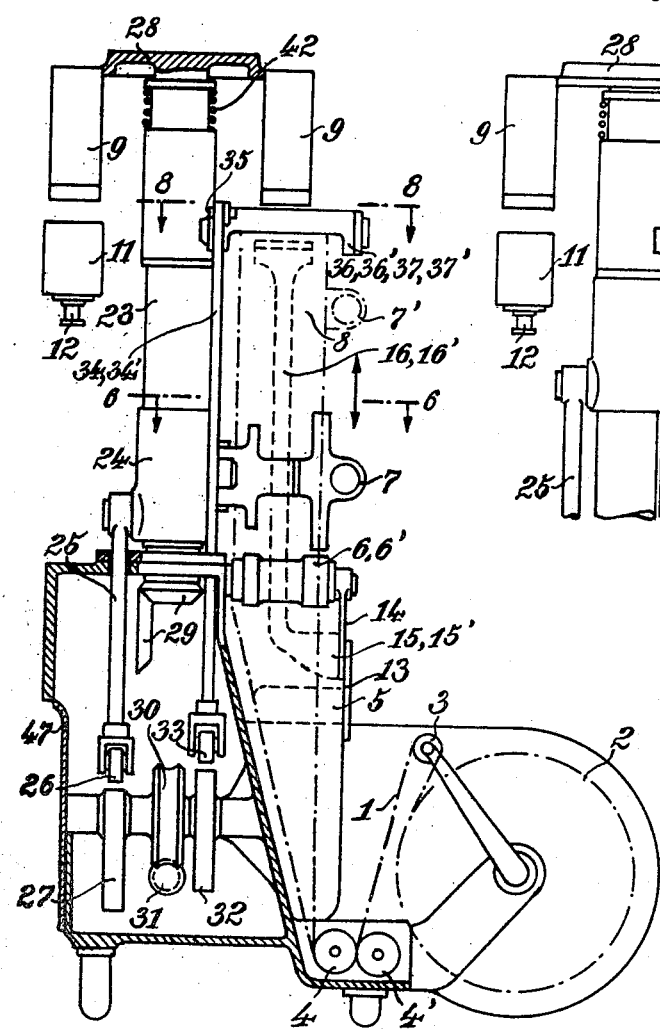
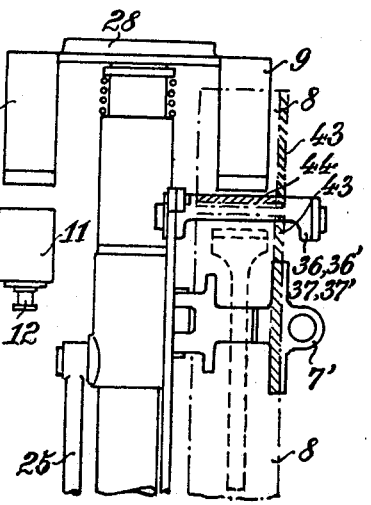
Fig. 3
Fig. 4
INVENTOR
Paul Schmidt
by:
Michael S. Striker
Attorney

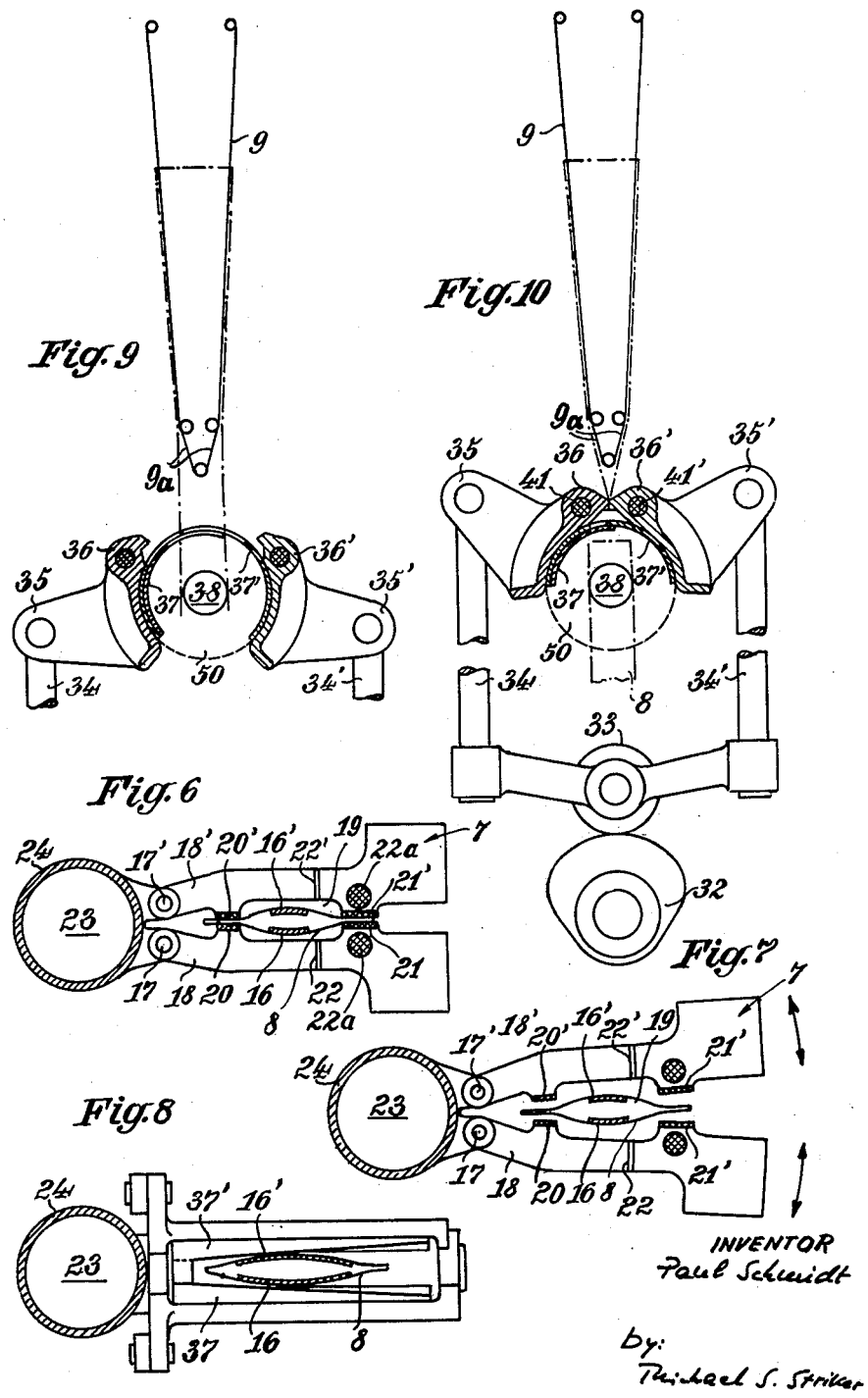

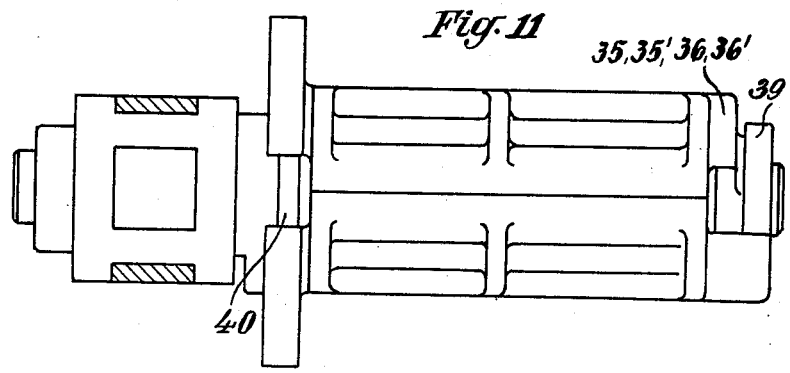
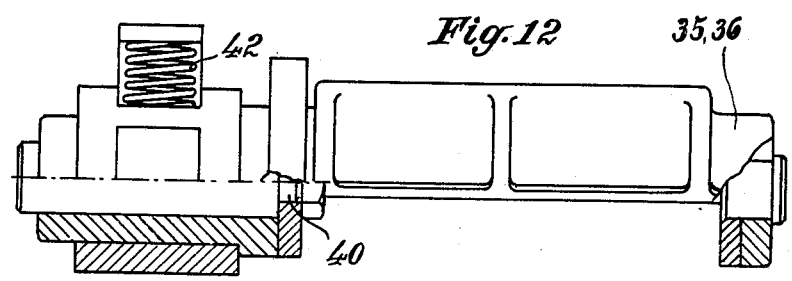
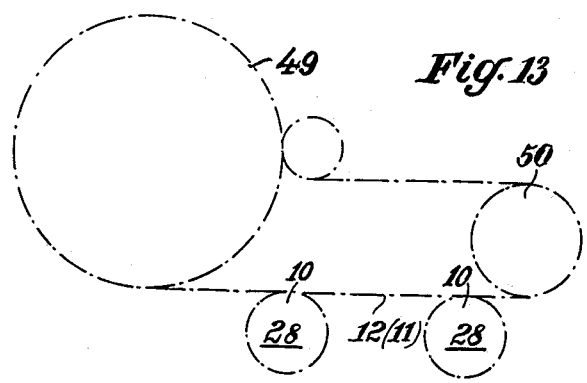

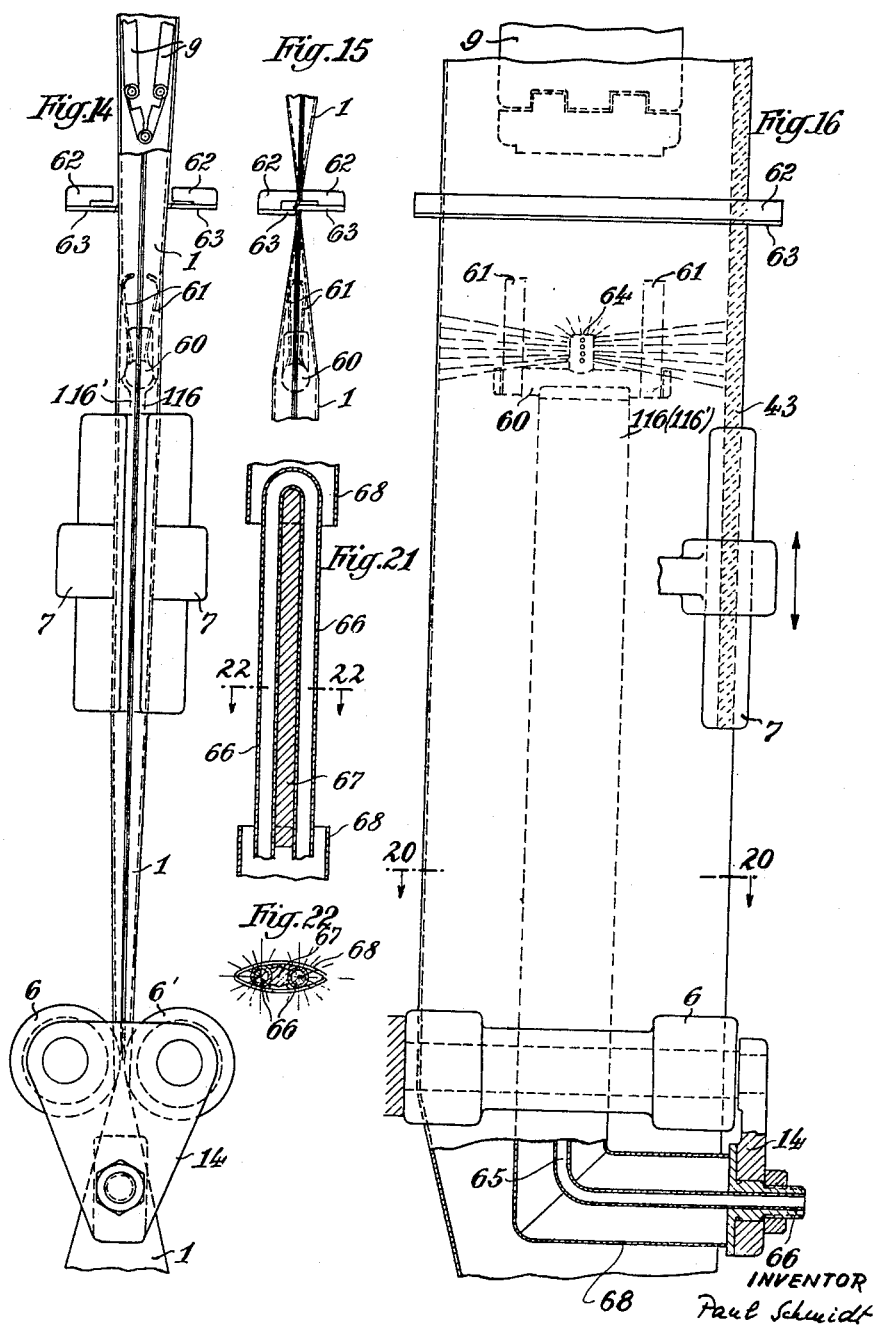

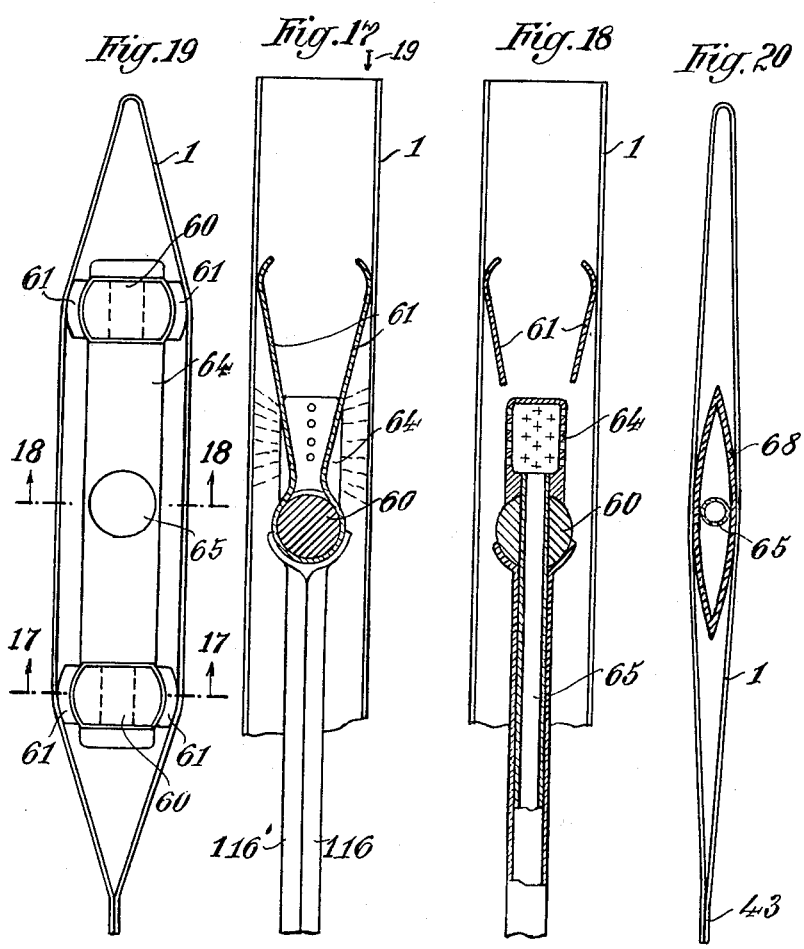

May 18, 1965  P. SCHMIDT  3,183,799
CONTAINER MAKING ARRANGEMENT
Filed Sept. 19, 1962  10 Sheets-Sheet 7

INVENTOR
Paul Schmidt
by
Michael S. Striker
Atty

May 18, 1965  P. SCHMIDT  3,183,799
CONTAINER MAKING ARRANGEMENT
Filed Sept. 19, 1962  10 Sheets-Sheet 8

INVENTOR
Paul Schmidt
by
Michael S. Striker
Atty

May 18, 1965 P. SCHMIDT 3,183,799
CONTAINER MAKING ARRANGEMENT
Filed Sept. 19, 1962 10 Sheets-Sheet 9
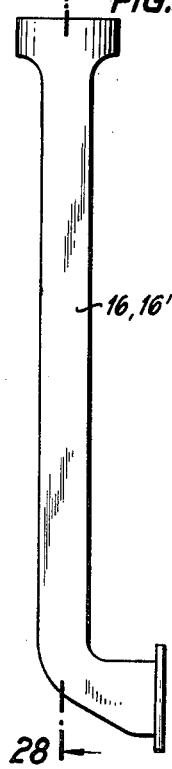
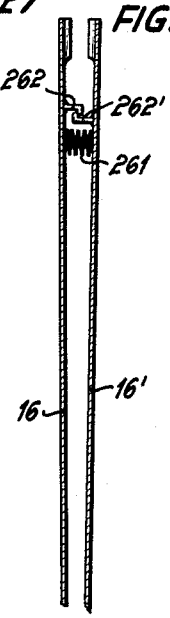
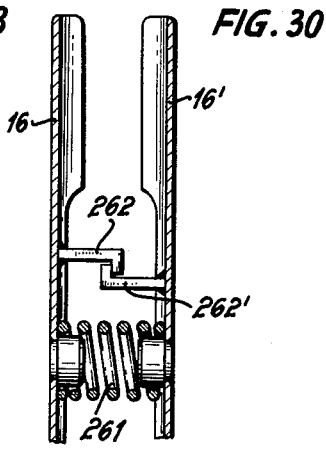
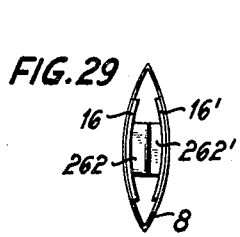
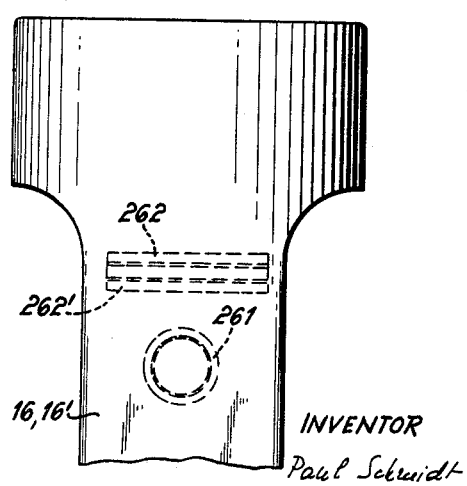
INVENTOR
Paul Schmidt
by
Michael J. Striker

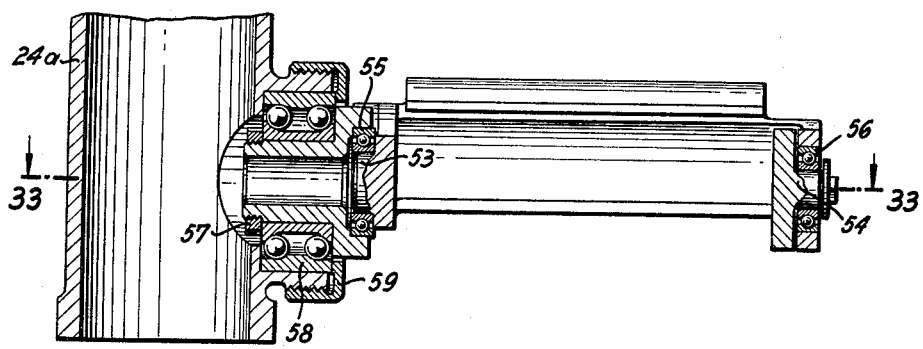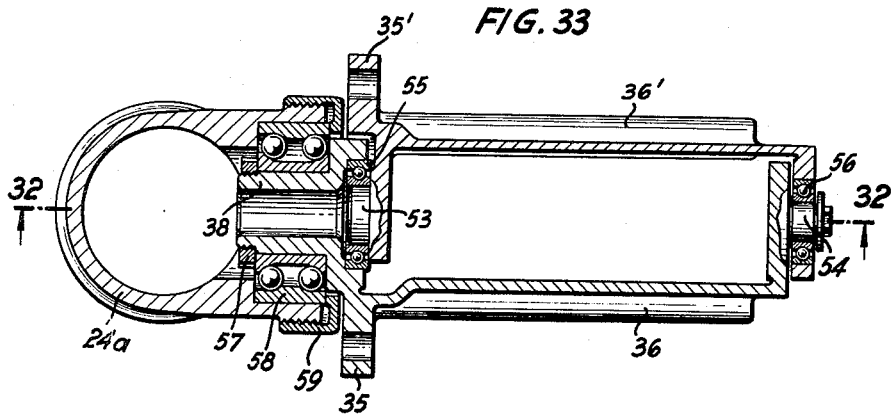

3,183,799
CONTAINER MAKING ARRANGEMENT
Paul Schmidt, Darmstadt, Germany, assignor to Habra-Werk, Wilhelm F. Ott, Darmstadt, Germany
Filed Sept. 19, 1962, Ser. No. 225,411
Claims priority, application Germany, Apr. 21, 1961,
H 42,368; Aug. 23, 1961, H 43,459
17 Claims. (Cl. 93—12)

This application is a continuation-in-part of my co-pending application Serial No. 189,024, filed April 20, 1962, now abandoned, entitled "Container Making Arrangement."

The present invention relates to a container making arrangement, and more particularly to a method and apparatus for making bag containers, and the like, of a web of sheet material which is adapted to be bonded and sealed by pressure, and preferably by simultaneously applied heat. Various methods and devices serving this purpose are known, and for example, in the U.S. Patent 2,997,831, a folded flat tubular web is transported by transporting rollers toward spreading members so that tube sections are placed on the spreading members, whereupon tube sections are sealed off by transverse seams, and cut-off so that flat bags are formed which are transported by the spreading members out of the path of the supplied tubular web. Thereupon the spreading members are operated to shape the flat bags into prismatic containers.

The known bag making devices are very complicated and consequently subject to great wear and tear.

It is one object of the present invention to overcome these disadvantages of the prior art constructions, and to provide an apparatus of simple construction which reliably operates to produce bags and containers in an economical and efficient manner when operated in accordance with a method of the invention.

Another object of the present invention is to provide combined sealing and transporting means which simultaneously form a tube of a web by sealing longitudinal edges of the web to each other, and transport the thus-formed tube to other sealing and cutting means which form a transverse bottom seam, and cut off flat finished bags.

With these objects in view, and other objects which will become apparent as the description of the apparatus and method proceeds, one embodiment of the invention comprises folding means for longitudinally folding a web of a sheet material so as to align the longitudinal edges of the web whereby two layers of the web are superimposed; combined sealing and transporting means operable between an open position spaced from the web and a sealing position engaging sections of the longitudinal edges of the web for bonding the same together whereby a tube is formed, the sealing and transporting means being operable, and preferably reciprocable, in longitudinal direction of the web for moving in the sealing positions the web for the lengths of the tube sections; bonding or sealing means for bonding each tube section along a transverse seam; and cutting means for cutting each tube section along a transverse cutting line so that the tube sections become bags separated from the web.

In the preferred embodiment of the invention, the combined sealing and transporting means transport the web along a first path and a series of supports, preferably including spreading members, move along a second path transverse to the first path and successively across the leading end of the web. This operation is carried out in synchronism with the transport of the web along the first path so that each tube section is placed on one of the supports, whereupon the transverse seams are formed, and the finished bags cut off. The supports transport the separated bags along a second path, and when the spreading members are operated, the flat bags are spread to assume the shape of prismatic containers. The second path along which the supports move, is preferably circular. Preferably resilient shaping means are arranged in such a manner that they are enveloped within the tube as the same is being formed of the web whereby the two folded layers of the tube are slightly spread apart which is necessary for placing the tube sections on the spreading supports.

The combined sealing and transporting means include a pair of turnable sealing members which are moved in transporting direction when clamping and sealing the web along the longitudinal seams thereof. In this manner, sections of the longitudinal edges of the folded web are sealed and bonded to each other, while the web is being transported for the length of the thus-formed tube sections.

In the preferred arrangement of the invention, the web consists of a material which can be heat sealed, and at least one of the two sealing members includes heating means, such as an electric resistor.

In order to prevent any interference between the transverse movement of the spreading supports and the forwardly fed leading end of the web, the sealing means which form the transverse bottom seams, and the cutting means which cut off the finished bags, do not move in a plane, but move on circular paths, and have a corresponding part-cylindrical shape. When the sealing and cutting members move apart, they do not move in the plane in which the finished bags are transported by the spreading supports, but move out of this plane.

Since the longitudinal edges of the web are bonded together directly before the transverse bottom seam is formed, it is possible to guide the web, before it is sealed along its longitudinal edges, onto shaping means which are then located in the tube formed of the web by the combined sealing and transport means.

In the preferred embodiment of the invention, a conconduit extends along the shaping means within the folded web, and terminates in a nozzle through which a steriliging fluid is introduced into the tube formed of the of superimposed folded layers of the web are sterilized, while contaminating air is substantially expelled from the tube sections.

In another embodiment of the invention, the shaping means include a portion which is provided with means producing sterilizing radiation so that the inner surfaces of superimposed folded layers of the web are sterilized.

The novel features which are considered as characteristic for the invention are set forth in particular in the appended claims. The invention itself, however, both as to its construction and its method of operation together with additional objects and advantages thereof, will be best understood from the following description of specific embodiment when read in connection with the accompanying drawings, in which:

FIG. 1 is a fragmentary schematic perspective view illustrating the principle of the bag making arrangement of the invention;

FIG. 2 is a front view of one embodiment of the invention;

FIG. 3 is a side view of the embodiment of FIG. 2, partially in section on line 3—3 in FIG. 2;

FIG. 4 is a fragmentary side view illustrating another operational position;

FIG. 5 is another plan view of the embodiment of FIG. 2;

FIG. 6 is a cross sectional view taken on line 6—6 in FIG. 3;

FIG. 7 is a cross sectional view taken on line 6—6 and illustrating another operational position;

FIG. 8 is a cross sectional view taken on line 8—8 in FIG. 3;

FIG. 9 is a fragmentary front view illustrating bonding and cutting means on an enlarged scale;

FIG. 10 is a fragmentary front view illustrating the bonding and cutting means in another operational position;

FIG. 11 is a plan view of the bonding and cutting means shown in FIGS. 9 and 10;

FIG. 12 is a fragmentary side view of the bonding and cutting means;

FIG. 13 is a schematic plan view illustrating the combination of two devices of the invention with conveyor means carrying the bags to filling and closing stations;

FIG. 14 is a fragmentary front view of another embodiment of the invention;

FIG. 15 is a fragmentary front view illustrating another operational position of the embodiment of FIG. 14;

FIG. 16 is a fragmentary side view of the embodiment of FIG. 14;

FIG. 17 is a longitudinal sectional view taken on line 17—17 in FIG. 19;

FIG. 18 is a longitudinal sectional view taken on line 18—18 of FIG. 19;

FIG. 19 is a plan view of the embodiment of FIG. 14 and FIG. 16;

FIG. 20 is a cross sectional view taken on line 20—20 in FIG. 16;

FIG. 21 is a longitudinal sectional view illustrating a detail of a modified embodiment; and FIG. 22 is a cross sectional view taken on line 22—22 in FIG. 21.

FIG. 27 is an enlarged view of the shaping member shown in FIG. 3;

FIG. 28 is a fragmentary longitudinal sectional view of FIG. 27;

FIG. 29 is a plan view of FIG. 28;

FIG. 30 is an enlarged detail of FIG. 28;

FIG. 31 is a side view of FIG. 30;

FIG. 32 is a longitudinal sectional view of FIG. 24 on line A—B in FIG. 33;

FIG. 33 is a cross sectional view of FIG. 23 on line C—D in FIG. 32.

Figure 23:
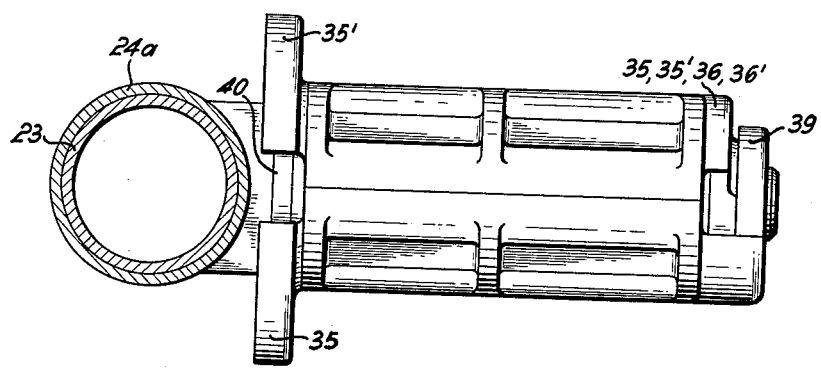
FIG. 23 is a plan view of a modified bonding and cutting means.

Referring first to FIG. 1 which illustrates the principle of the present invention, a band-shaped web 1 which may consist of paper having a heat-sealable surface layer, such as a film of a plastic material, or which may be a plastic foil, is taken off a supply reel 2 and is guided over a roller 3 and between a pair of rollers 4 having axes parallel to the axis of supply reel 2. Above and spaced from rollers 4, another pair of cooperating rollers 6, 6' is located, whose axes extend perpendicular to the axes of rollers 4. A guide 5 is located between rollers 4 and rollers 6, 6', and has such a shape that the web 1 is folded about a center line to form two superimposed layers so that rollers 6, 6' transport two superimposed folded layers whose longitudinal edges are aligned, while rollers 4 must have twice the axial length of rollers 6, 6' to transport the web before the web is folded along the middle thereof.

A pair of sealing members 7 is reciprocable in vertical direction, as indicated by the double arrow, and grips the superimposed longitudinal edges of the folded web 1 while moving upwardly, so that sections of the longitudinal edges of the folded web are bonded together whereby tube sections 8 are formed. The forward movement of the sealing members 7 in sealing position gripping the web effects transport of the sealed tubular sections 8 toward the support 9 which moves along a circular path. The movements of the combined sealing and transporting means 7 and of the supports 9 are synchronized so that one tube section 8 is placed on each support 9. As will be explained hereinafter, the tube section is cut off when placed on a support 9, so that it may be transported to a station 10 where the tube section is deposed in a hopper 11 from which each tube section, or finished bag, is removed by a horizontal conveyor 12.

At the moment in which the tube sections are placed on the supports 9, a transverse bottom seam is also formed which closes the tube section which thus becomes a flat bag mounted on a support 9. As will be explained hereinafter, each support 9 includes a pair of spreading members which move apart during travel of the bags on supports 9, so that the bags are spread and assume a prismatic shape. As is explained in the U.S. Patent 2,997,831, spreading members operating in this manner form triangular flaps on the bottom of the container, and such flaps are flattened and attached to the bottom of the container by a suitable device.

The apparatus performs the following synchronized operations:

(1) Folding of the web along a longitudinal center fold line so that the longitudinal edges of the web are superimposed.

(2) Sealing and bonding sections of the superimposed longitudinal edges of the web, simultaneously transporting the tubular sections so that they are placed on the spreading supports 9, forming a transverse bottom seam and cutting off the thus-formed flat bags.

(3) Spreading of the flat bags to form a prismatic container having a flat bottom, and finishing the bottom.

(4) Stripping the container off the spreading supports 9 so that the containers fall into the hopper 11.

(5) Conveying of the containers to a filling station by means of conveyor 12.

FIG. 13 shows two devices as described with reference to FIG. 1 in a schematic manner, and two rotary carriers of spreading supports 9 are indicated by the reference numeral 28. The conveyor 11 and boxes or hoppers 12 are schematically indicated by a dash and dot line, and it will be understood that the finished containers of both bag making devices are placed in the boxes or hoppers of conveyor 11 and transported by the same. Along the path of conveyor 11, a filling station is provided in the region 49, and the filled containers are transported by conveyor 11 to a closing station indicated at 50 where the filled containers are closed. In the following region of conveyor 11, the filled closed containers are removed, so that the boxes 12 of conveyor 11 are again empty and ready to receive empty containers at the stripping stations 10.

Referring now to FIGS. 2 to 8, which illustrate one embodiment of the apparatus of the invention, the web 1 is taken off a supply reel 2 and folded along a center line over a guide 5 which is supported on a supporting rail 13 mounted on a bracket plate 14. A pair of guide rollers 6–6' transports the folded web with two layers of the web superimposed, and with the longitudinal edges of the web aligned on one side of the folded web. As best seen in FIG. 3, the rollers 6, 6' have recessed center portions, and engage the web only with the roller end portions. Consequently, the two layers of the web can be spread apart which is accomplished by shaping means having transverse end portions 15–15 projecting laterally out of the folded web, and elongated shaping portions 16–16 which extend between the layers of the web and between the rollers 6,6'. As best seen in the sectional views of FIGS. 6, 7 and 8, and in FIG. 27 the shaping member 16, 16' are narrow, but have wider end portions near the upper ends of the web for more fully spreading the superimposed layers of the web. The lower portions of the shaping means 16, 16' are narrow enough to pass between the operative end portions of rollers 6, 6' so that the central portions of the superimposed layers of the web are slightly spread apart to laterally project into the recesses of rollers 6, 6'. It will be understood that in the region of the end portions 15, 15', the web is only folded and open on the side, whereas in the sections of FIGS. 6, 7 and 8, the longitudinal edges are already sealed, as will be explained hereinafter. The end portions 15, 15' are secured to the supporting bracket 14, and springs 261 urge the shaping member 16, 16' apart as best seen in FIG. 28 so that the superimposed layers of the web are slightly spread as shown in FIGS. 6, 7 and 8.

Combined sealing and transporting means 7 are located above rollers 6, 6', and include a pair of sealing members 18, 18' which are mounted for turning movement on a carrier including a sleeve 24 which is mounted for movement along a guide shaft 23. A connecting rod 25 is pivotally mounted on sleeve 24, and has at is lower end a cam follower roller 26 cooperating with a cam 27 mounted on a shaft which is rotated by a motor, not shown, through transmission means including a worm spindle 31, and a worm gear 30. The same shaft also carries a cam 32 cooperating with a cam follower 33 whose function will be explained hereinafter.

The sealing members 18, 18' are movable between the sealing position shown in FIG. 6, and an open position shown in FIG. 7. The sealing members 18, 18' have recesses 19 which together form a space through which the shaping members 16, 16' pass. Sealing members 18, 18' have resilient pressure members 20, 20' and 21, 21' mounted thereon which, in the sealing position shown in FIG. 6, respectively grip the superimposed longitudinal edges of the web, and the region of the web near the longitudinal center fold line. The free end portions of sealing members 18, 18' are heated, and are thermo-insulated from the other portions by insulating members 22 and 22'. Electrical heat resistor elements 22a are embedded in the sealing members 18, 18', and heat the pressure members 21, 21' so that longitudinal sections of the superimposed longitudinal edges of the web are bonded together in the sealing position illustrated in FIG. 6.

While the sealing members 18, 18' are in the sealing position shown in FIG. 6 in which the pressure members 20, 20' and 21, 21' grip the web, cam 27 is operative to raise sleeve 24 with sealing members 18, 18' of the sealing means 7 from the lower position shown in FIG. 3 to the higher position 7' shown in FIG. 4. The gripped web is transported in this manner a distance which substantially corresponds to the length of the web section which was sealed by the sealing members 17, 17'. When the sealing means 7 has arrived in the position 7', sealing members 18, 18' move apart to the position of FIG. 7 so that the web is released, whereupon the cam 27 assumes a position permitting cam follower 26 and sleeve 24 to move downwardly to the position of FIGS. 3 and 7, without any influence on the web.

From the above description it will become apparent that members 18, 18' 24, 20, 20', 21, 21', 22a constitute combined sealing and transporting means for simultaneously forming tube sections by sealing sections of the longitudinal edges of the web, and for transporting the tube sections substantially a distance corresponding to the length of the tube sections.

A turntable 28 is mounted on top of guide shaft means 23 and carries suspended from the periphery thereof, a series of supports 9 including two spreading members, and articulated links 9a connecting the spreading members. When the spreading supports 9 are in the flat position illustrated in FIG. 9, a tubular web section transported by the combined transporting and sealing means 7 is pushed onto the same. A pair of bevel gears 29, one of which is driven from the motor, not shown, and the other of which is connected by a shaft to the turntable 28, effects turning movement of turntable 28, and movement of the spreading supports 9 along a circular path transverse to the path of movement of the tubular web sections 8. The turning movement of turntable 28, and the movement of the spreading supports 9 along the circular path is synchronized with the transporting movement of the reciprocable combined sealing and transporting means 7 so that a spreading support 9 is located at the leading tubular end of the web when the tubular web is advanced.

As soon as tubular sections of the web are placed on a support 9, a transverse seam is formed across the trailing end of the tubular web 7, and the respective tubular section is cut off so that a flat bag is formed which is supported on a spreading support 9, and travels with the same.

Combined bonding and cutting means are provided for this purpose, and it will be understood that in the present application the terms "bonding" and "sealing" are used interchangeably. Cam 32 reciprocates through cam follower 33 and a pair of push rods 34 and 34', a pair of lever arms 35, 35' which are secured to a pair of bonding members 36, 36'. Bonding members 36, 36' are of part-cylindrical configuration, and cutting members 37, 37' of the same shape are attached to the bonding members 36, 36', as best seen in FIGS. 9 and 10. The combined bonding and cutting members are turnable about a common axis which coincides with the axis of the part-cylindrical bonding and cutting members. The journals and bearings 39, 40 for the combined bonding and cutting members are shown in FIGS. 11 and 12.

When cam 32 operates the push rod 34, 34', the combined bonding and cutting members 35, 35', 36, 36', 37, 37' are moved about the circular path 50 until the pressure faces of the bonding members 36, 36' abut the layers of the web and press the layers against each other so that a transverse seam is produced by the heat of the heat sealing elements 41 and 41'. The transverse seam extends across the superimposed layers of the tubular web section which is located on a spreading support 9, so that the respective tube section is closed at the bottom and forms a bag. At the same time, the cutting members 37, 37' are moved to the cutting position, as shown in FIG. 10, so that the bags are cut along a transverse cutting line trailing the transverse seam formed by the bonding members 36, 36'. The bonding members and cutting members are operative before cam follower roller 33 has arrived at the extremity of cam 32. Consequently, the closed bonding members and cutting members are raised a small distance until the extremity of cam 32 passes under roller 33. Since the closed bonding members 36, 36' engage the cut off tube section, the same is separated from the web along the cutting line. This additional movement is possible since the support on which shaft 38 and bearings 40, 39 of the bonding and cutting members are mounted abuts a spring 42, see FIG. 12, which is compressed when the combined bonding and cutting means are raised in closed position.

When the combined bonding and cutting members are raised, they move away from the end of the tubular web and portion 8, so that the same can spread apart under the action of the end portions of the shaping means 16, 16'. Otherwise, the cutting members 37, 37' would be in the way of leading ends of the layers of the tube section 8 although the same was separated from the finished bag by the cutting line.

A finished and cut off bag is best seen in FIG. 4 which shows the longitudinal seam 43 produced by the sealing members 80, 18', and a transverse bottom seam 44 produced by the bonding members 36, 36'. The flat bags are transported by the spreading supports 9 in the flat condition shown in FIGS. 9 and 10 out of the region of the combined bonding and cutting members, whereupon the spreading members of the supports 9 are spread apart by suitable means, for example such as disclosed in the U.S. Patent 2,997,831 for forming prismatic containers having flat rectangular bottoms.

Triangular flaps are formed together with the rectangular bottom, and project from the same. A guide member 46, shown in FIGS. 2 and 5 is provided along the path of spreading members 9 and below the same, to bend the triangular flap against the bottom of the container. The longitudinal seam 43 also projects from the wall of the container, and is bent over flat against the container wall by a segment shaped guide member 45, shown in FIG. 5. Thereupon, the finished containers are stripped of the spreading support 9 at a station 10, and deposited on the conveyor means 11, 12.

The cam shaft and gear means are preferably mounted within a housing 47 which may have a transparent wall. Another housing 48 covers the supply reel 10, and rollers 4, 4'.

The apparatus operates in the following manner:

The web 1 is guided over the guide 5 with the heat-sealable coating facing inward. An edge of guide 5 extends along the center of the web, so that the web is folded about a longitudinal central fold line whereby two superimposed layers are formed which are transported by rollers 6, 6'. The layers are slightly spread by the shaping means 15, 15' and 16, 16' which extend from the guide 5 toward the combined bonding and cutting means 36, 36', 37, 37'. The end portions 15, 15' may be downwardly tapered to facilitate the slight spreading of the superimposed layers.

Under control of cam 27, the sealing and transporting members 18, 18' are moved toward each other to a sealing position gripping the folded web as shown in FIG. 6, while the closed sealing and transporting members are simultaneously moved from the position of FIG. 3 to the position of FIG. 4 whereby tube sections are simultaneously sealed and transported toward the spreading support 9, and toward the bonding and cutting members 36, 36', 37, 37' which are opened and in the positions of FIG. 9 so that the leading tube section can be placed on a spreading support 9 which has arrived in a synchronized movement at the leading end of the tube section before the same was transported by the combined sealing and transporting means 7. When the transported web is in the position of FIG. 4 in which a tube section 8 is placed on a spreading support 9, cam 32 effects a synchronized operation of the combined bonding and cutting members 36, 36', 37, 37' to the position shown in FIG. 10 so that a transverse seam is produced across the tube section held on spreading support 9, while simultaneously the thus-formed bag is cut off the web by the cutting members 37, 37'. Thereupon, the combined bonding and cutting members are slightly raised by cams 32 in closed position, so that the cutting members 37, 37' move away from the next following trailing tube section 8, permitting the same to open, while the finished bag is reliably separated from the web. When the extremity of cam 32 passes the follower roller 33, the sealing members and cutting members open first, whereupon the spring 42 is permitted to expand to move the sealing and cutting members downward to the initial position.

The radius and the circumferential extension of the bonding members 36, 36', and the angle of movement thereof is designed in such a manner that the released bags on spreading supports 9 can pass above the open bonding members 36, 36' in a horizontal plane during the following turning movement of turntable 28, as best seen in FIG. 9.

The embodiment of FIGS. 14 to 19 operates on the principle explained with reference to FIGS. 1 to 13. A web is folded and passes between rollers 6, 6' to combined transporting and sealing means 7 which form a longitudinal seam 43 along the superimposed edges of the web, while transporting the thus-formed tubular web toward spreading supports 9. Combined bonding and cutting means 62, 63 are provided for forming a bottom seam across the tubular web, and for cutting off the finished bag. The embodiment is modified as far as the shaping means are concerned. The shaping means 116 and 116' carry at the upper end thereof two pairs of springs 61 mounted on a transverse pin 60. The shaping members 116, 116' form a flat tube 68, as best seen in FIG. 20, and the spreading of the superimposed layers is achieved by the springs 61 which are effective in the tube sections of the web produced by the combined sealing and transporting means 7.

A nozzle 64 is also supported on the transverse pin 60 and connected to a conduit 65 extending in the tubular shaping means 68, as best seen in FIGS. 18 and 20. Tubular shaping means 68 has a lower bent end portion, so that an inlet socket can be provided on the conduit 65. A corresponding element is placed on socket 66 to connect conduit 65 with a pressure vessel containing a sterilizing fluid which is thus discharged from nozzle 64 into the interior of the tubular web section to sterilize the same before the bags are formed. The sterilizing fluid may be a gas, an atomized liquid, or a powder. Since the sterilizing fluid is effective directly before the bags are formed and in the closed tubular section of the web, contaminating air is expelled from the tubular web section before the bags are formed.

Another modified embodiment is illustrated in FIGS. 21 and 22. The nozzle and conduit are omitted, and the sterilization of the web interior is obtained by radiation. For this purpose, the shaping means 68 is interrupted, and interconnected by rib 67. Radiation means 66 are inserted between the two separated portions of the shaping means 68, and radiate the inner surfaces of the superimposed layers of the web.

It will be understood that the conduit 65 with the sterilizing nozzle 64, as well as the radiation means 66 may also be provided in the embodiment of FIGS. 1 to 12. In such an arrangement conduit 65 would be located between the two shaping members 16, 16', and the nozzle slightly above the upper end of the shaping members 16, 16' which would be correspondingly shortened. Similarly, the shaping members 16, 16' could be interrupted and connected by a rib corresponding to rib 67, carrying a source of radiation.

In the embodiments illustrated in FIGS. 11 and 12, the supports of the combined bonding and cutting means 35, 35', 36, 36' are mounted on a guide shaft defining the circular path of the bonding and cutting members. The guide shaft is combined with a lower solid rest. An upper pressure plate for the spring 42 is fastened with the lower solid rest.

Figure 24:
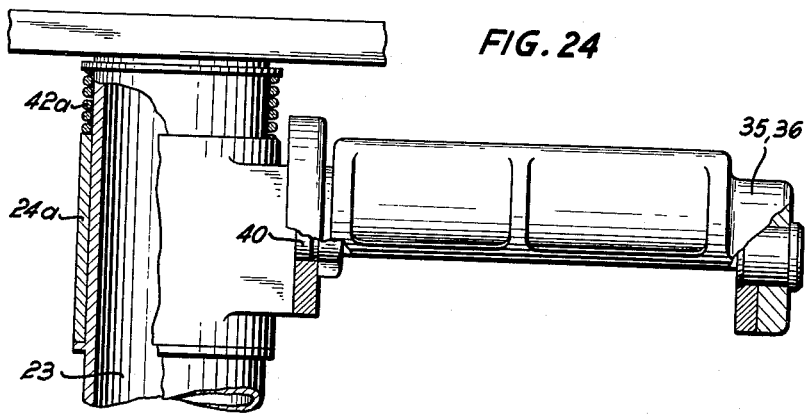
FIG. 24 is a side view of FIG. 23.

The construction of FIGS. 23 and 24 corresponds to FIG. 3. A sleeve 24a is provided on the guide shaft 23 on the upper end under the spring 42. The bonding members 36, 36' with the lever arms 35, 35' are mounted on this sleeve turnable about a circular guide 40.

FIGS. 32 and 33 show a modified embodiment. The bonding members 36, 36' are turnable connected to each other by the journals 53 and 54 and the ball bearings 55 and 56 and can be separated from each other by axial movement. Both bonding members 36, 36' are mounted on sleeve 24a. The bonding member 36 is fitted into the ball bearing 58 with its hollow journal 38 and fastened by a nut 57. Ball bearing 58 is fastened on the sleeve 24a by a screw cap 59. The bonding member 36' has a journal 53 which is turnable in the ball bearing 55. On the other side the bonding member 36' with the ball bearing 56 is turnable on the journal 54 of bonding member 36. Instead of the ball bearings other modifications of bearings may be used, e.g. sleeve bearings.

On the lever arms 35, 35' the push rods 34, 34' are mounted for operating the bonding and cutting means.

Figure 25:
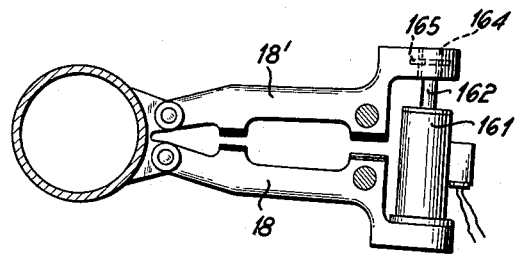
FIG. 25 is a cross-sectional view illustrating a modified construction of the sealing members illustrated in FIG. 7.
Figure 26:
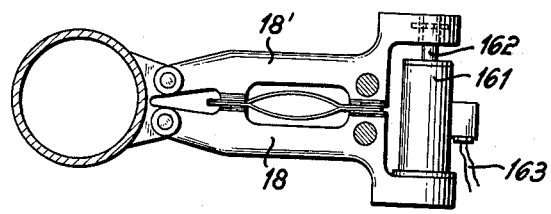
FIG. 26 is a view corresponding to FIG. 25 with closed sealing members.

The opening and closing of the sealing members 18, 18' is effected in the ambodiment of FIGS. 25 and 26 with a double lifting magnet. Within the stationary magnet coil 161 an armature of magnet 162 is longitudinally movably mounted. The double lifting magnet can be fastened on an extension of the sealing member 18 and has a connection with a switch (not shown) over electrical wires 163. This switch is synchronically operated according to the operation of the machine, e.g. by the cam 27 opposite to the roller 26 and so that in the lower position 7 in FIG. 3 the armature 162 is drawn in and the sealing members 18, 18' are closed. In the upper position 7' in FIG. 3 the armature 162 is driven out and the sealing members 18, 18' are opened. The armature 162 is movably mounted in coil 161 and secured in a bore 164 by a locking disc 165 in the extension of the sealing member 18'.

The shaping members 16, 16' can be spread apart by a spring 261 on the upper end as shown in FIGS. 28 and 30. This spring 261 can be mounted for example on journals which are attached to shaping members 16, 16'. The spreading can be limited to the desired extent by limit members 262 and 262'.

Instead of inelastic shaping members 16, 16', shaping members made of spring steel can be used which are elastically deformed so that the spring 261 can be omitted.

It will be understood that each of the elements described above, or two or more together, may also find a useful application in other types of methods for making bags differing from the types described above.

While the invention has been illustrated and described as embodied in a method and apparatus for making sterilized bags of a continuous web, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. An apparatus of the type described comprising, in combination, folding means for longitudinally folding a web of a sheet material so as to align the longitudinal edges of the web whereby two layers of the web are super-imposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections; while the web remains at a standstill during the return stroke of said combined sealing and transporting means in said open position; a series of supports movable successively and in synchronism with the operation of said sealing and transporting means to and from a position located at the leading end of the web so that each tube section is placed by said combined sealing and transporting means moving forwardly onto one of said supports; bonding means for bonding each tube section along a transverse seam while said web is at a standstill; and cutting means for cutting each tube section along a transverse cutting line off the web while said web is at a standstill.

2. An apparatus for making bags, containers, and the like, comprising, in combination, vertical folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web and in vertical direction for moving in said sealing position said web stepwise forward along a first vertical path in longitudinal direction of the same for the lengths of tube sections while the web remains at a standstill during the return stroke of said combined sealing and transporting means in said open position; a series of supports movable along a second horizontal path and successively across the leading end of said web in synchronism with the operation of said sealing and transporting means so that each tube section is placed by said combined sealing and transporting means moving forwardly onto one of said supports; bonding means for bonding each tube section along a transverse seam while said web is at a standstill, and being located on said first vertical path between said supports and said sealing and transporting means; and cutting means located between said bonding means and said combined sealing and transporting means for cutting each tube section along a transverse cutting line off the web while said web is at a standstill so that said tube sections become bags separated from said web and transported by said supports along said second horizontal path.

3. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same the lengths of tube sections while the web remains at a standstill during the return stroke of said combined sealing and transporting means in said open position; a series of supports movable along a second circular path transverse to said first path and successively across the leading end of said web in synchronism with the operation of said sealing and transporting means so that each tube section is placed by said combined sealing and transporting means moving forwardly onto one of said supports; bonding means for bonding each tube section along a transvehse seam while said web is at a standstill, and being located on said first path between said supports and said sealing and transporting means; and cutting means located between said bonding means and said combined sealing and transporting means for cutting each tube section along a transverse cutting line off the web while said web is at a standstill so that said tube sections become bags separated from said web and transported and deposited by said supports along said second path.

4. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; a series of supports movable along a second path transverse to said first path and successively across the leading end of said web in synchronism with the operation of said sealing and transporting means so that each tube section is placed by said combined sealing and transporting means moving forwardly onto one of said supports, each support including a pair of spreading members movable between a closely spaced position for receiving a tube section and a spreading position farther spaced from each other; bonding means for bonding each tube section along a transverse seam while said web is at a standstill, and being located on said first path between said supports and said sealing and transporting means; and cutting means located between said bonding means and said combined sealing and transporting means for cutting each tube section along a transverse cutting line off the web while said web is at a standstill so that said tube sections become bags separated from said web and transported by said supports along said second path, said bags being shaped into prismatic containers when said spreading members are moved to said spreading position.

5. An apparatus for making bags, containers, and the like, comprising, in combination, folding means for longitudinally folding a web of a sheet material so as to align the longitudinal edges of the web whereby two layers of the web are superimposed; combined sealing and transporting means including a pair of sealing members operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; a series of supports movable along a second path transverse to said first path and successively across the leading end of said web in synchronism with the operation of said sealing and transporting means so that each tube section is placed by said combined sealing and transporting means moving forwardly onto one of said supports; bonding means for bonding each tube section along a transverse seam while said web is at a standstill, and being located on said first path between said supports and said sealing and transporting means; and cutting means located between said bonding means and said combined sealing and transporting means for cutting each tube section along a transverse cutting line off the web while said web is at a standstill so that said tube sections become bags separated from said web and transported by said supports along said second path.

6. An apparatus for making bags, containers, and the like, comprising, in combination, folding means for longitudinally folding a web of a sheet material so as to align the longitudinal edges of the web whereby two layers of the web are superimposed; combined sealing and transporting means including a pair of sealing members operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; guide means extending parallel to said first path; a carrier mounted on said guide means for movement along the same, said carrier supporting said sealing members for turning movement between said open and sealing positions; means for reciprocating said carrier on said guide means so that said sealing means are reciprocated in longitudinal direction of said web; means for moving said sealing members between said open and sealing positions so that said sealing members are in said sealing position when said sealing and transporting means move forward and are in said open position when said sealing means move rearward in said longitudinal direction; a series of supports movable along a second path transverse to said first path and successively across the leading end of said web in synchronism with the operation of said sealing and transporting means so that each tube section is placed by said combined sealing and transporting means moving forwardly onto one of said supports; bonding means for bonding each tube section along a transverse seam while said web is at a standstill, and being located on said first path between said supports and said sealing and transporting means; and cutting means located between said bonding means and said combined sealing and transporting means for cutting each tube section along a transverse cutting line off the web while said web is at a standstill so that said tube sections become bags separated from said web and transported by said supports along said second path.

7. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; shaping means extending from said folding means and past said sealing and transporting means along said first path so as to be located between said layers and in said tube spaced from said edges so that said tube sections are spread in the region of the leading end of the web; a series of supports movable along a second path transverse to said first path and successively across the leading end of said web in synchronism with the operation of said sealing and transporting means so that each spread tube section is placed by said combined sealing and transporting means moving forwardly onto one of said supports; bonding means for bonding each tube section along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transported by said supports along said second path.

8. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being operable in longitudinal direction of said web for moving in said sealing position said web along a first path in longitudinal direction of the same for the lengths of tube sections; shaping means including a pair of shaping members, and resilient means for spreading said shaping members apart, said shaping members extending from said folding means and past said sealing and transporting means along said first path so as to be located between said layers and in said tube spaced from said edges so that said tube sections are spread; a series of supports movable along a second path transverse to said first path and successively across the leading end of said web in synchronism with the operation of said sealing and transporting means so that each spread tube section is placed onto one of said supports; bonding means for bonding each tube section along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transported by said supports along said second path.

9. An apparatus for making bags, containers, and the like, comprising, in combination, folding means for longitudinally folding a web of a sheet material so as to align the longitudinal edges of the web whereby two layers of the web are superimposed, said folding means including a pair of folding rollers and a guide for forming a center fold line in said web; combined sealing and transporting means operable between an open position spaced from said web and a sealing position engaging sections of said longitudinal edges for bonding the same together whereby a tube is formed of the web, said sealing and transporting means being operable in longitudinal direction of said web for moving in said sealing position said web along a first path in longitudinal direction of the same for the lengths of tube sections; shaping means extending from said folding means and past said sealing and transporting means along said first path so as to be located between said layers and in said tube spaced from said edges so that said tube sections are spread, said shaping means having an end portion extending between said folding rollers and into the region of said guide; a series of supports movable along a second path transverse to said first path and successively across the leading end of said web in synchronism with the operation of said sealing and transporting means so that each spread tube section is placed onto one of said supports; bonding means for bonding each tube section along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transporated by said supports along said second path.

10. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; a series of supports movable along a second path transverse to said first path and successively across the leading end of said web in synchronism with the operation of said sealing and transporting means so that each tube section is placed by said combined sealing and transporting means moving forwardly onto one of said supports; bonding means for bonding each tube section on a support along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transported by said supports along said second path, said cutting means including a pair of part-cylindrical cutting members movable along circular paths about the axes thereof between a spaced position permitting passage of the transported web and transverse movement of the bags along said second path, and a cutting position.

11. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; a series of supports movable along a second path transverse to said first path and successively across the leading end of said web in synchronism with the operation of said sealing and transporting means so that each tube section is placed by said combined sealing and transporting means moving forwardly onto one of said supports; bonding means for bonding each tube section on a support along a transverse seam, and being located on said first path between said supports and said sealing and transporting means, said bonding means including a pair of part-cylindrical bonding members movable along circular paths about the axes thereof between a spaced position permitting passage of the transported web and transverse movement of the bags with said supports along said second path, and a bonding position; and cutting means located between said bonding means and said combined sealing and transporting means for cutting each tube section on a support along a transverse cutting line off the web so that said tube sections become bags separated from said web and transported by said supports along said second path.

12. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; a series of supports movable along a second path transverse to said first path and successively across the leading end of said web in synchronism with the operation of said sealing and transporting means so that each tube section is placed by said combined sealing and transporting means moving forwardly onto one of said supports; bonding means for bonding each tube section on a support along a transverse seam while said web is at a standstill, and being located on said first path between said supports and said sealing and transporting means, said bonding means including a pair of part-cylindrical bonding members movable along circular paths about the axes thereof between a spaced position permitting passage of the transported web and transverse movement of the bags with said supports along said second path, and a bonding position; and cutting means located between said bonding means and said combined sealing and transporting means for cutting each tube section along a transverse cutting line off the web while said web is at a standstill so that said tube sections become bags separated from said web and transported by said supports along said second path, said cutting means including a pair of part-cylindrical cutting members movable along circular paths about the axes thereof between a spaced position permitting passage of the transported web and transverse movement of the bags along said second path, and a cutting position, said bonding members and said cutting members being secured to each other for joint movement.

13. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being operable in longitudinal direction of said web for moving in said sealing position said web along a first path in longitudinal direction of the same for the lengths of tube sections; shaping means extending from said folding means and past said sealing and transporting means along said first path so as to be located between said layers and in said tube spaced from said edges so that said tube sections are spread; a nozzle means mounted on said shaping means in said tube, and a conduit means extending along said shaping means so that a sterilizing fluid can be introduced into the tube; a series of supports movable along a second path transverse to said first path and successively across the leading end of said web in synchronism with the operation of said sealing and transporting means so that each spread tube section is placed onto one of said supports; bonding means for bonding each tube section along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transported by said supports along said second path.

14. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being operable in longitudinal direction of said web for moving in said sealing position said web along a first path in longitudinal direction of the same for the lengths of tube sections; hollow elongated shaping means extending from said folding means and past said sealing and transporting means along said first path so as to be located between said layers and in said tube spaced from said edges so that said tube sections are spread; a nozzle means mounted on said shaping means in said tube, and a conduit means extending along said shaping means within the same and having a projecting inlet portion so that a sterilizing fluid can be introduced into the tube; a series of supports movable along a second path transverse to said first path and successively across the leading end of said web in synchronism with the operation of said sealing and transporting means so that each spread tube section is placed onto one of said supports; bonding means for bonding each tube section along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transported by said supports along said second path.

15. An apparatus for making bags, containers, and the like, comprising, in combination, folding means for longitudinally folding a web of a sheet material so as to align the longitudinal edges of the web whereby two layers of the web are superimposed; combined sealing and transporting means operable between an open position spaced from said web and a sealing position engaging sections of said longitudinal edges for bonding the same together whereby a tube is formed of the web, said sealing and transporting means being operable in longitudinal direction of said web for moving in said sealing position said web along a first path in longitudinal direction of the same for the lengths of tube sections; shaping means extending from said folding means and past said sealing and transporting means along said first path so as to be located between said layers and in said tube spaced from said edges so that said tube sections are spread, said shaping means including a portion including means for emitting a sterilizing radiation whereby the inner surfaces of said layers are sterilized; a series of supports movable along a second path transverse to said first path and successively across the leading end of said web in synchronism with the operation of said sealing and transporting means so that each spread tube section is placed onto one of said supports; bonding means for bonding each tube section along a transverse seam, and being located on said first path between said supports and said sealing and transporting means; and cutting means located between said bonding means and said combined sealing and transporting means for cutting each tube section along a transverse cutting line off the web so that said tube sections become bags separated from said web and transported by said supports along said second path.

16. An apparatus for making bags, containers, and the like, comprising, in combination, folding means for longitudinally folding a web of a sheet material so as to align the longitudinal edges of the web whereby two layers of the web are superimposed; combined sealing and transporting means including a pair of sealing members operable between an open position spaced from said web and a sealing position engaging sections of said longitudinal edges for bonding the same together whereby a tube is formed of the web, said sealing and transporting means being reciprocable in longitudinal direction of said web for moving in said sealing position said web stepwise forward along a first path in longitudinal direction of the same for the lengths of tube sections while the web remains at a standstill during the return stroke of said combined sealing and transporting means in said open position; a series of supports movable along a second circular path transverse to said first path and successively across the leading end of said web in synchronism with the operation of said sealing and transporting means so that each tube section is placed by said combined sealing and transporting means moving forwardly onto one of said supports, each support including a pair of spreading members movable between a closely spaced position for receiving a tube section and a spreading position farther spaced from each other; bonding means for bonding each tube section along a transverse seam while said web is at a standstill, and being located on said first path between said supports and said sealing and transporting means; and cutting means located between said bonding means and said combined sealing and transporting means for cutting each tube section along a transverse cutting line off the web while said web is at a standstill so that said tube sections become bags separated from said web and transported and deposited by said supports along said second path, said bags being shaped into prismatic containers when said spreading members are moved to said spreading position.

17. An apparatus for making bags, containers, and the like, comprising, in combination, folding means for longitudinally folding a web of a sheet material so as to align the longitudinal edges of the web whereby two layers of the web are superimposed; combined sealing and transporting means including a pair of sealing members operable between an open position spaced from said web and a sealing position engaging sections of said longitudinal edges for bonding the same together whereby a tube is formed of the web, said sealing and transporting means being reciprocable in longitudinal direction of said web stepwise forward for moving in said sealing position said web along a first path in longitudinal direction of the same for the lengths of tube sections while the web remains at a standstill during the return stroke of said combined sealing and transporting means in said open position; shaping means extending from said folding means and between said sealing members along said first path so as to be located between said layers and in said tube spaced from said edges so that said tube sections are spread; a series of supports movable along a second path transverse to said first path and successively across the leading end of said web in synchronism with the operation of said sealing and transporting means so that each spread tube section is placed by said combined sealing and transporting means moving forwardly onto one of said supports; bonding means for bonding each tube section along a transverse seam while said web is at a standstill, and being located on said first path between said supports and said sealing and transporting means, said bonding means including a pair of part-cylindrical bonding members movable along circular paths about the axes thereof between a spaced position permitting passage of the transported web and transverse movement of the bags along said second path, and a bonding position; and cutting means located between said bonding means and said combined sealing and transporting means for cutting each tube section along a transverse cutting line off the web while said web is at a standstill so that said tube sections become bags separated from said web and transported by said supports along said second path, said cutting means including a pair of part-cylindrical cutting members movable along circular paths about the axes thereof between a spaced position permitting passage of the transported web and transverse movement of the bags along said second path, and a cutting position, said bonding members and said cutting members being secured to each other for joint movement.

References Cited by the Examiner

UNITED STATES PATENTS 2,577,386 12/51 Vergobbi _____ 93—18
2,698,046 12/54 Finke.

FRANK E. BAILEY, *Primary Examiner.*